US007967983B2

(12) United States Patent
Grevin

(10) Patent No.: US 7,967,983 B2
(45) Date of Patent: Jun. 28, 2011

(54) LIQUID DISPENSING END-PIECE AND LIQUID PACKAGING AND DISPENSING ASSEMBLY COMPRISING SUCH AN END-PIECE

(75) Inventor: Guillaume Grevin, Gruchet Saint Simeon (FR)

(73) Assignee: Rexam Pharma, Offranville (FR)

( * ) Notice: Subject to any disclaimer, the term of this patent is extended or adjusted under 35 U.S.C. 154(b) by 361 days.

(21) Appl. No.: 12/364,730

(22) Filed: Feb. 3, 2009

(65) Prior Publication Data

US 2009/0223883 A1 Sep. 10, 2009

(30) Foreign Application Priority Data

Feb. 4, 2008 (FR) ..................................... 08 50680

(51) Int. Cl.

| | |
|---|---|
| ***B01D 63/00*** | (2006.01) |
| ***B01D 29/00*** | (2006.01) |
| ***B01D 24/00*** | (2006.01) |
| ***B01D 35/00*** | (2006.01) |
| ***B65D 37/00*** | (2006.01) |
| ***B67D 7/76*** | (2010.01) |

(52) U.S. Cl. ................... 210/321.75; 210/474; 210/475; 222/189.06; 222/189.09; 222/212; 222/215

(58) Field of Classification Search ............. 210/321.75, 210/474, 475, 473; 222/212, 189.06, 215, 222/476, 189.09, 421, 420, 632, 179.08, 222/482

See application file for complete search history.

(56) References Cited

U.S. PATENT DOCUMENTS

| | | | | |
|---|---|---|---|---|
| 4,785,978 | A * | 11/1988 | Kano et al. | 222/482 |
| 4,938,389 | A * | 7/1990 | Rossi et al. | 222/189.08 |
| 5,373,972 | A * | 12/1994 | Bystrom et al. | 222/212 |
| 6,207,052 | B1 * | 3/2001 | Webb | 210/321.75 |
| 6,708,850 | B2 * | 3/2004 | Uetake et al. | 222/189.06 |
| 7,059,499 | B2 * | 6/2006 | Masuda | 222/321.9 |
| 2007/0164051 | A1 | 7/2007 | Mijers et al. | |

FOREIGN PATENT DOCUMENTS

| | | |
|---|---|---|
| DE | 20 2004 009 721 | 8/2004 |
| EP | 1 495 747 | 1/2005 |

OTHER PUBLICATIONS

French Search Report dated Aug. 22, 2008, from corresponding PCT application.

* cited by examiner

*Primary Examiner* — Ana M Fortuna
(74) *Attorney, Agent, or Firm* — Young & Thompson

(57) ABSTRACT

This end-piece is of the type including two filtering membranes and support portions for supporting the membranes and channelling the fluid through the membranes. According to one aspect of the invention, it includes a connection portion which is moulded over the support portions in order to fix them together and the support portions include an upper support portion, a lower support portion and an intermediate support portion which is arranged between the upper support portion and the lower support portion, a membrane is retained between the upper support portion and the intermediate support portion and a membrane is retained between the intermediate support portion and the lower support portion and the membranes are overmoulded by the connection portion.

13 Claims, 7 Drawing Sheets

LIQUID DISPENSING END-PIECE AND LIQUID PACKAGING AND DISPENSING ASSEMBLY COMPRISING SUCH AN END-PIECE

FIELD OF THE INVENTION

The present invention relates to a liquid dispensing end-piece, of the type comprising two filtering membranes and support portions for supporting the membranes and channelling the liquid through the membranes.

BACKGROUND OF THE INVENTION

The filtering membranes used in end-pieces of this type are fragile. This makes the production of such a liquid dispensing end-piece complex and costly, even more so when the end-piece comprises a plurality of membranes.

An object of the invention is to provide a liquid dispensing end-piece which has a plurality of filtering membranes and which is easy and economical to produce.

SUMMARY OF THE INVENTION

To this end, the invention proposes a liquid dispensing end-piece of the above-mentioned type, which comprises a connection portion which is moulded over the support portions in order to fix them together, and wherein the support portions comprise an upper support portion, a lower support portion, and an intermediate support portion which is arranged between the upper support portion and the lower support portion, and wherein a membrane is retained between the upper support portion and the intermediate support portion and a membrane is retained between the intermediate support portion and the lower support portion.

According to other embodiments, the liquid dispensing end-piece comprises one or more of the following features, taken in isolation or according to any technically possible combination:

the membranes are overmoulded by the connection portion;

the support portions and the membranes are superimposed in a longitudinal direction;

it comprises two separate fluid circulation passages which are defined by the support portions, each of the two membranes extending across a respective passage;

a said passage has two ends and opens at one end through the upper support portion and at one end through the lower support portion;

a said passage has two ends and opens at one end through the intermediate support portion and at the other end through the lower support portion;

it comprises a passage for circulation of air, the membrane extending across the air passage being hydrophobic, and a passage for circulation of liquid, the membrane extending across the liquid passage being hydrophilic;

the intermediate support portion is connected to both the lower support portion and the upper support portion by means of snap-fitting;

the connection portion surrounds the intermediate support portion;

the intermediate support portion comprises reinforcement ribs;

the end piece further comprises a fluid channelling pipe, and the reinforcement ribs comprise at least one set of radial ribs which extend across the fluid channelling pipe of the intermediate support portion;

the support portions have a stacking axis (A-A), and the connection portion is overmoulded by means of injection from several locations which are distributed about the stacking axis of the support portions;

the intermediate portion defines at least one hole for receiving a member for locking an injection mould of the connection portion, which member is intended to be inserted in the at least one hole in order to immobilise the intermediate portion during the injection of the connection portion; and at least one of the at least one holes for receiving a locking member defined by the intermediate portion delimits a portion of a passage for circulation of fluid through the end-piece, which opens laterally via the hole.

The invention also relates to a liquid packaging and dispensing assembly comprising a receptacle which has a neck, and an end-piece as defined above, arranged on the neck.

The invention and the advantages thereof will be better understood from a reading of the following description, given purely by way of example and with reference to the appended drawings.

DETAILED DESCRIPTION OF THE PREFERRED EMBODIMENT

Figure 1:
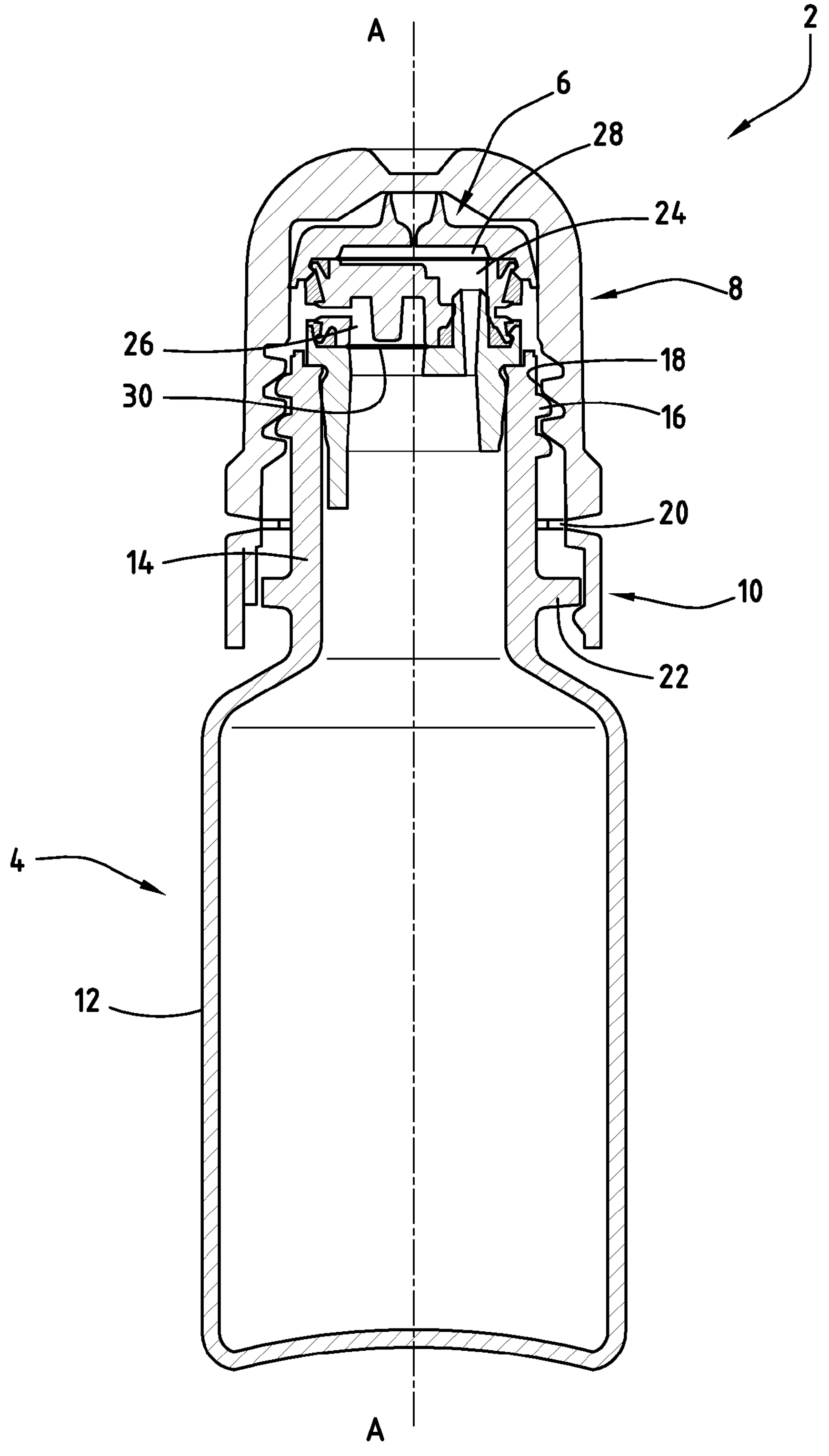
FIG. 1 is a sectioned view of a liquid packaging and dispensing assembly comprising a liquid dispensing end-piece in accordance with the invention.
Figure 2:
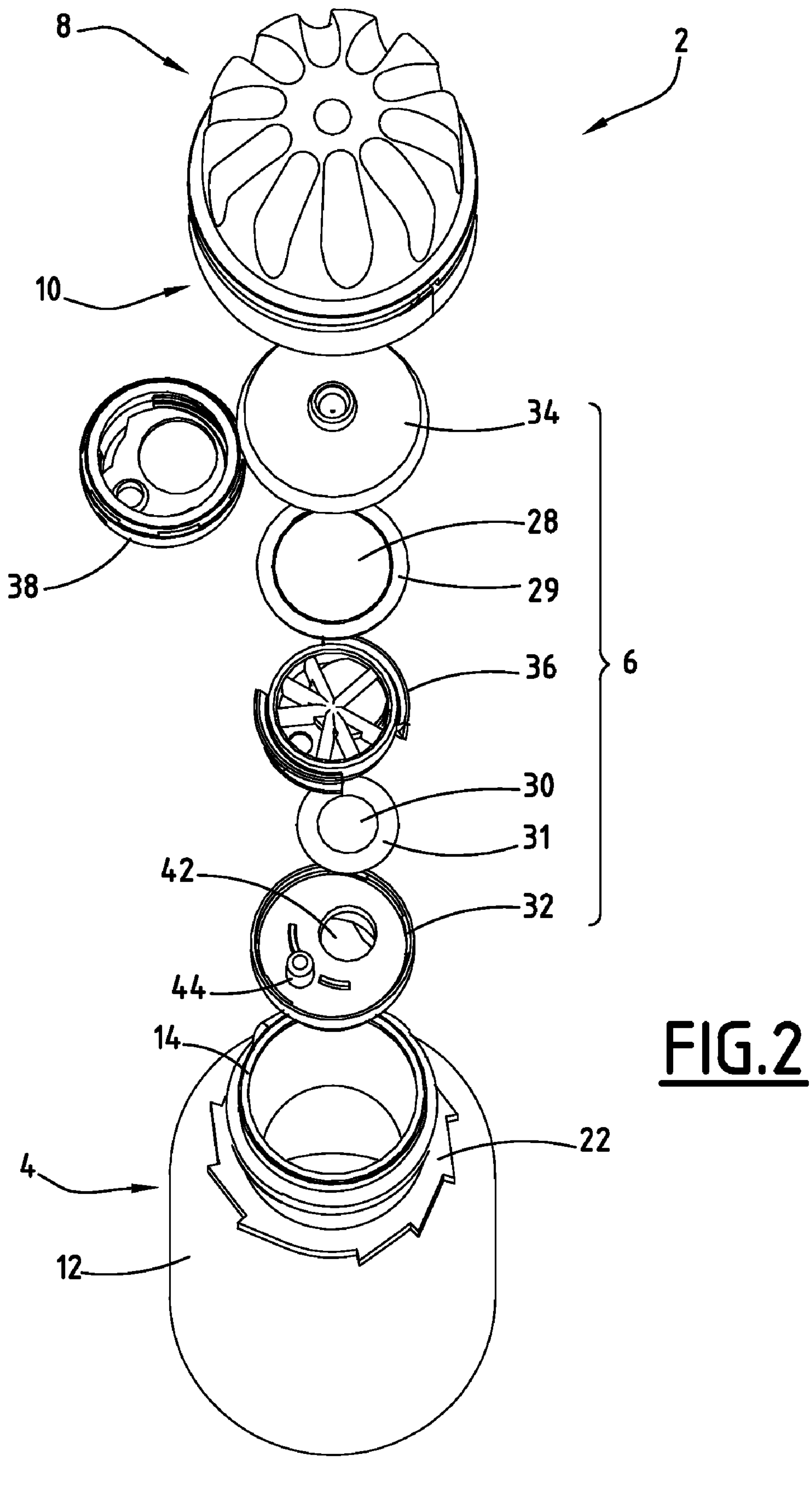
FIGS. 2 and 3 are exploded perspective and sectioned views, respectively, of the liquid packaging and dispensing assembly of FIG. 1.
Figure 3:
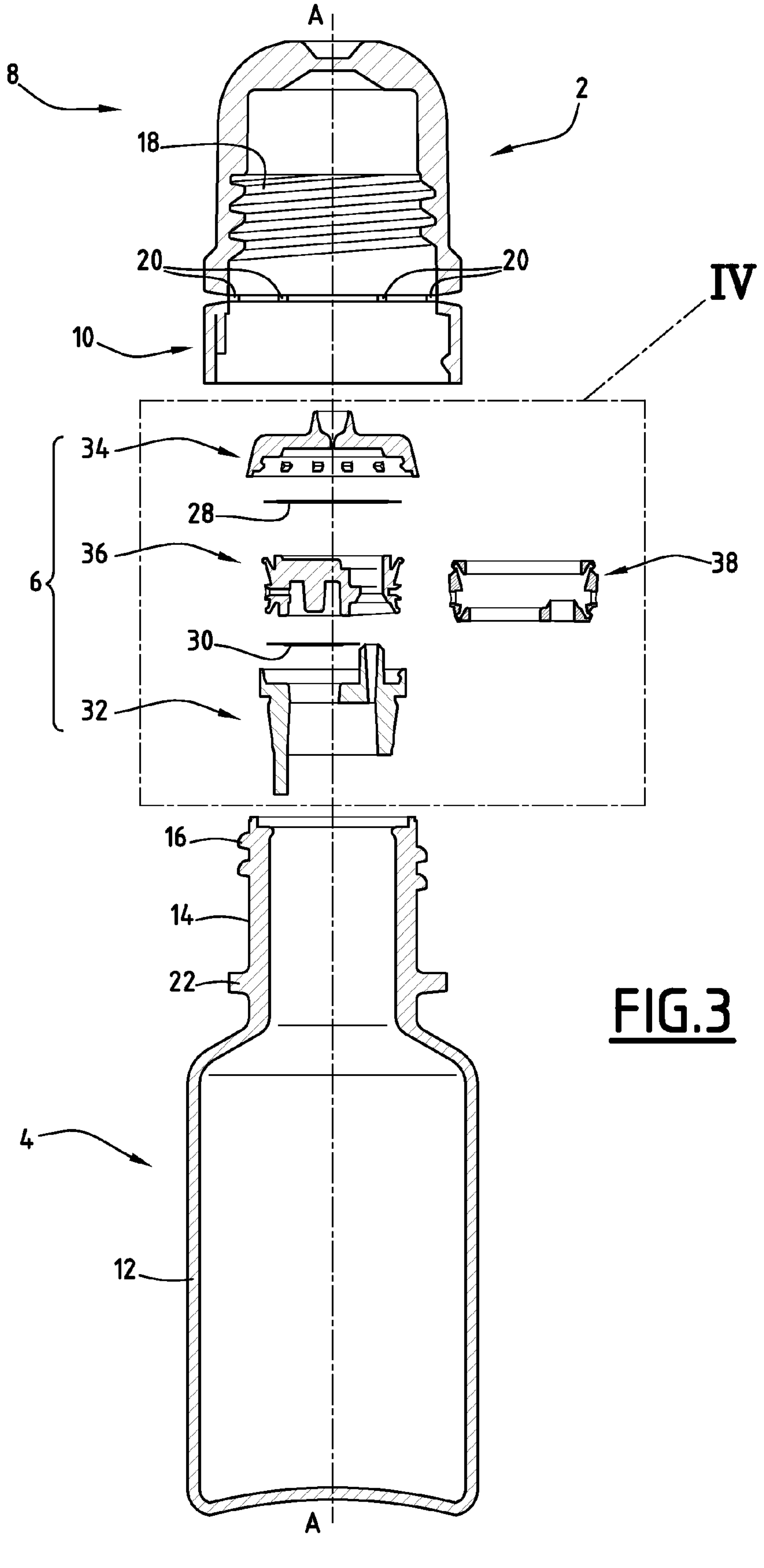

FIGS. 1 to 3 illustrate an assembly 2 for packaging and dispensing an ophthalmic liquid in the form of an aqueous solution.

The assembly 2 comprises a receptacle 4 which is intended to contain the ophthalmic liquid, a drop-counting end-piece 6, a stopper 8 for closing the receptacle 4 and a tamper-evident belt or ring 10 which indicates the first opening of the assembly 2.

In the example illustrated, the receptacle 4 is a plastics material bottle which contains the ophthalmic liquid which has not been illustrated in the Figures. The receptacle 4 has a hollow body 12 which is extended with an upper neck 14 which extends along a vertical longitudinal axis A-A.

In conventional manner, the walls of the body 12 can be resiliently deformed by means of pinching in order to bring about a reduction of the inner space of the body 12 and the discharge of the ophthalmic liquid through the neck 14.

The neck 14 comprises an outer threaded portion 16 which complements an inner threaded portion 18 of the stopper 8 in order to screw the stopper 8 onto the neck 14.

The tamper-evident ring 10 is initially connected to the stopper 8 by means of breakable tabs 20 and is intended to become separated from the stopper 8 when it is opened for the first time.

To this end, the tamper-evident ring 10 comprises studs (not illustrated) which protrude towards the inner side of the tamper-evident ring 10 and which are intended to co-operate with a toothed crown 22 (FIG. 2) of the neck 14 in order to allow the tamper-evident ring 10 to rotate in the screwing direction of the stopper 8 in order to allow it to be positioned, and to prevent the tamper-evident ring 10 from rotating in the unscrewing direction of the stopper 8 in order to retain the tamper-evident ring 10 until the tabs 20 have been broken when the stopper 8 is opened for the first time.

The end-piece 6 is intended to be fitted in the neck 14 in order to allow the ophthalmic liquid to be dispensed drop by drop whilst filtering the ophthalmic liquid being discharged from the receptacle 12 and the air entering the receptacle 12.

The end-piece 6 has two distinct and separate passages: a first liquid discharge passage 24 and a second air inlet passage 26 (FIG. 1).

The end-piece 6 comprises a hydrophilic micro-filtering membrane 28 which is arranged across the first passage 24 and a hydrophobic micro-filtering membrane 30 which is arranged across the second passage 26.

The hydrophilic membrane 28 has the function of filtering the liquid being discharged from the receptacle 12 and preventing the entry of air via the first passage 24. The hydrophobic membrane 30 has the function of filtering the air which enters the receptacle 12 in order to prevent contamination of the liquid and preventing the liquid from being discharged via the second passage 26.

As illustrated in FIG. 3, the end-piece 6 comprises support portions which comprise a lower portion 32, an upper portion 34 and an intermediate portion 36 arranged between the support portions 32, 34.

The end-piece 6 comprises a connection portion 38 which is overmoulded on the support portions 32, 34, 36 in order to fix them together.

The membranes 28, 30 are retained between the support portions 32, 34, 36 and the two passages 24, 26 are defined through the support portions 32, 34, 36 which serve to channel the liquid and the air through the membranes 28, 30.

Figure 4:
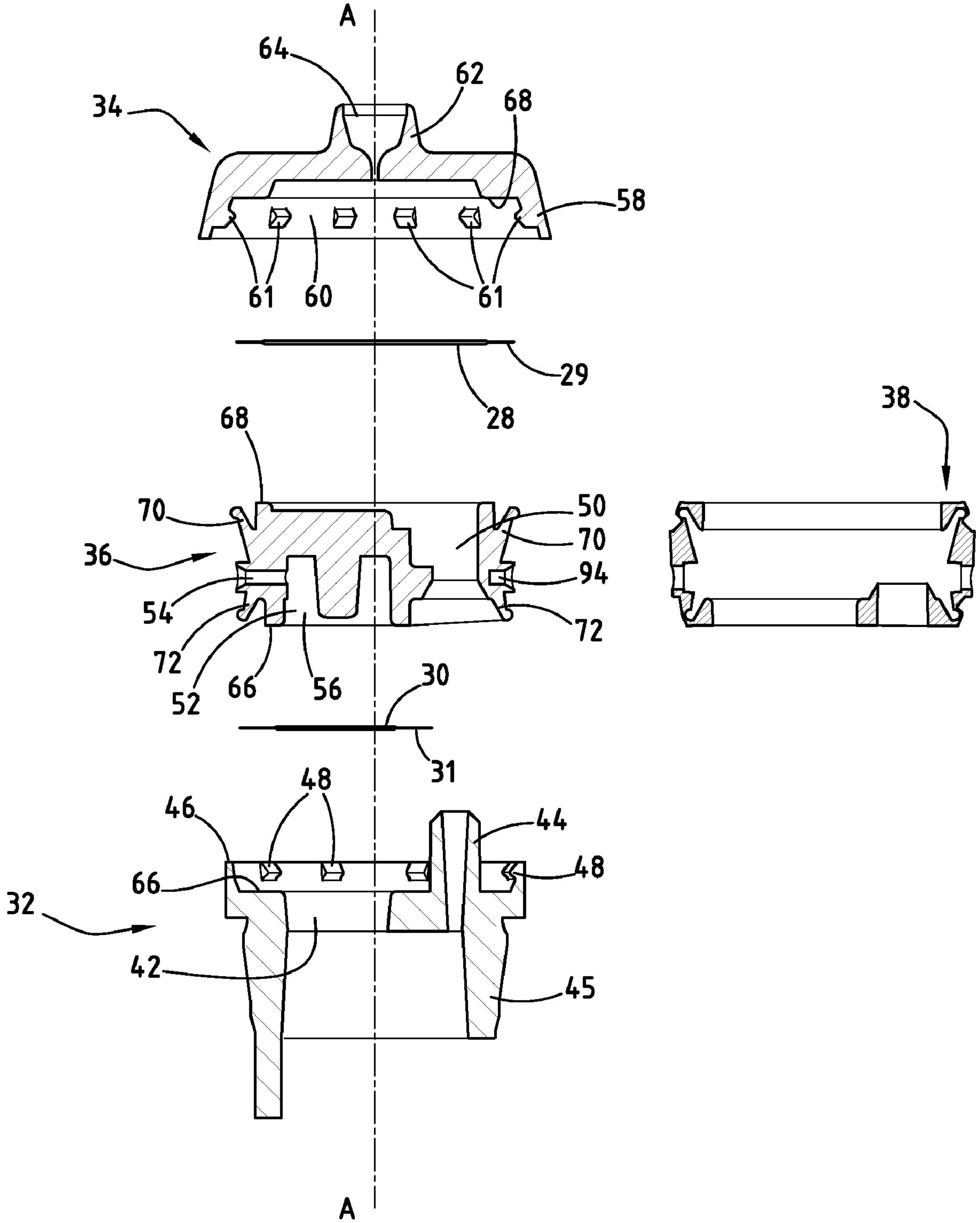
FIGS. 4 and 5 are exploded and assembled sectioned views, respectively, of the end-piece alone.

As illustrated in FIG. 4, the lower portion 32 is generally in the form of a cylindrical disc having an axis A-A and comprises an opening 42, a cannula 44 which protrudes upwards, a fixing skirt 45 which protrudes downwards and which is intended to be fitted inside the neck 14, and an annular upper rim 46 which protrudes upwards and which is provided with internal reliefs 48 which are distributed along the upper rim 46.

The intermediate portion 36 is generally in the form of a cylindrical disc having an axis A-A and comprises a first conduit 50 and a second conduit 52 which extend through the intermediate portion 36. The first conduit 50 is stepped and extends along the longitudinal axis, becoming wider in an upward direction. The second conduit 52 comprises an inlet channel 54 and a chamber 56, the chamber 56 being open in a downward direction and the inlet channel 54 extending transversely between a lateral outer surface of the intermediate portion 36 and the chamber 56.

The upper portion 34 is generally in the form of a cylindrical disc having an axis A-A and comprises an annular lower rim 58 which protrudes downwards and which delimits a downwardly open recess 60 which is provided with internal reliefs 61, a liquid dispensing nozzle 62 which protrudes upwards, and an outlet channel 64 which extends inside the nozzle 62 between a base of the recess 60 and the upper end of the nozzle 62.

The outlet channel 64 allows ophthalmic liquid to be dispensed drop by drop, with a calibrated drop size, when the body 12 is squeezed by the user between his fingers. To this end, it comprises in conventional manner a narrowed portion which is followed by a widened portion.

When the support portions 32, 34, 36 are superimposed along the axis A-A, the upper portion 34 and the lower portion 32 are retained with axial spacing from each other by the intermediate portion 36.

Furthermore, on the one hand, the opening 42 is connected to the chamber 56 in order to define the second passage 26 which opens in a downward direction and via the opening 42 through the lower portion 32 and transversely via the inlet channel 54, through the intermediate portion 36, between the upper portion 34 and the lower portion 32.

On the other hand, the cannula 44 is connected to the first conduit 50 which is connected to the recess 60, in order to define the first passage 24, which opens at one end, downwards and via the cannula 44, through the lower portion 32 and, at the other end, upwards and via the outlet channel 44, through the upper portion 34.

The hydrophobic membrane 30 is arranged between the lower portion 32 and the intermediate portion 36. The lower portion 32 and the intermediate portion 36 comprise annular supports 66, between which the hydrophilic membrane 28 is clamped so that the hydrophobic membrane 30 extends across the second passage 26 and an edge region 31 of the hydrophobic membrane 30 protrudes outwards.

The hydrophilic membrane 28 is arranged between the upper portion 34 and the intermediate portion 36. The upper portion 34 and the intermediate portion 36 comprise annular supports 68, between which the hydrophilic membrane 28 is clamped so that the hydrophilic membrane 28 extends across the first passage 24 and an edge region 29 of the hydrophilic membrane 28 protrudes outwards.

The end-piece 6 comprises means for fixing by snap-fitting the lower portion 32 to the intermediate portion 36 and the intermediate portion 36 to the upper portion 34.

In the example illustrated, the snap-fitting means comprise a first set of flexible members 70 which are provided on the intermediate portion 36 and which are intended to co-operate with the internal reliefs 61 of the lower rim 58, and a second set of flexible members 72 which are provided on the intermediate portion 36 and which are intended to co-operate with the internal reliefs 48 of the upper rim 46.

Figure 6:
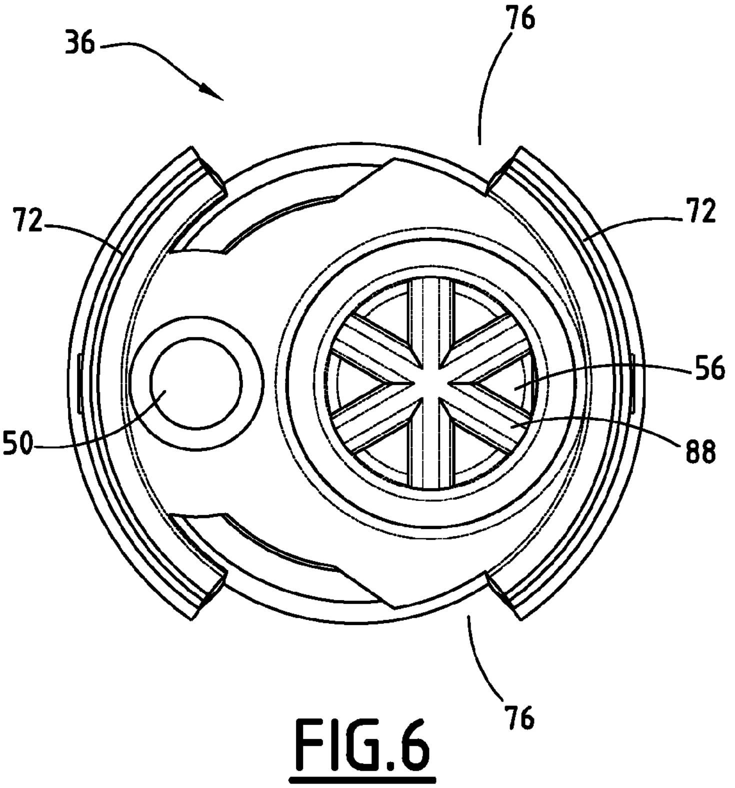
FIGS. 6 and 7 are bottom and top views of an intermediate support portion of the end-piece.
Figure 7:
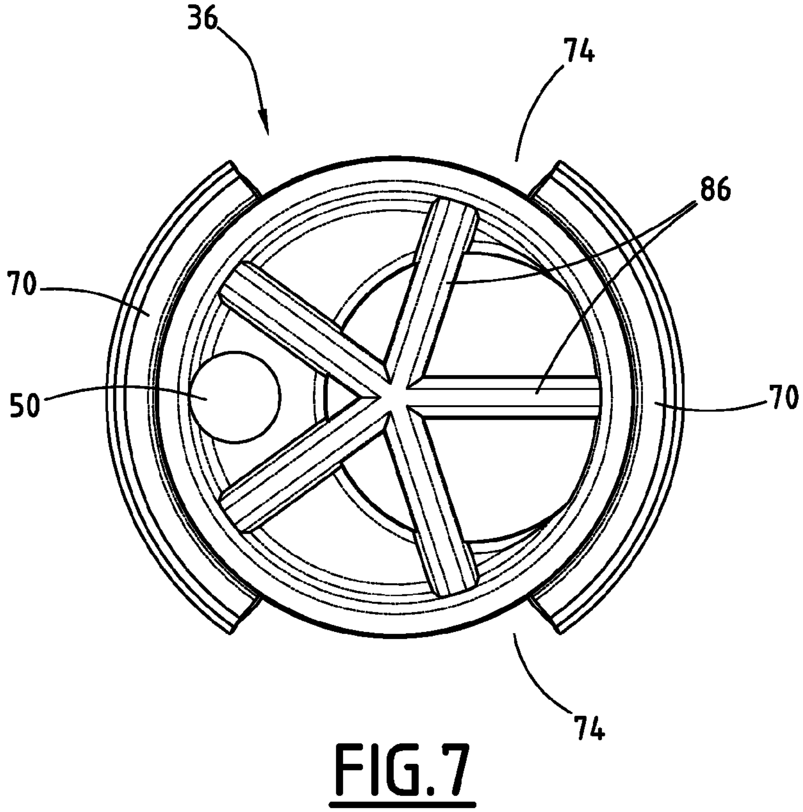

As illustrated in FIGS. 6 and 7, the flexible members 70 of the first set are inclined and extend radially outwards and upwards. Each flexible member 70 extends around the axis A-A over a limited angular portion. The flexible members 70 are distributed around the intermediate portion 36 and separated by spaces 74.

When the intermediate portion 36 is moved closer to the upper portion 34, the flexible members 70 of the first set engage by means of resilient return on the internal reliefs 61 and immobilise the intermediate portion 36 on the upper portion 34.

The flexible members 72 of the second set are similar. They protrude radially outwards and downwards. Each flexible member 72 extends about the axis A-A over a limited angular portion. They are distributed around the intermediate portion 34 and are separated by spaces 76.

When the intermediate portion 36 is moved closer to the lower portion 32, the flexible members 72 of the second set engage by means of resilient return on the internal reliefs 48 and immobilise the intermediate portion 36 on the lower portion 32.

Figure 5:
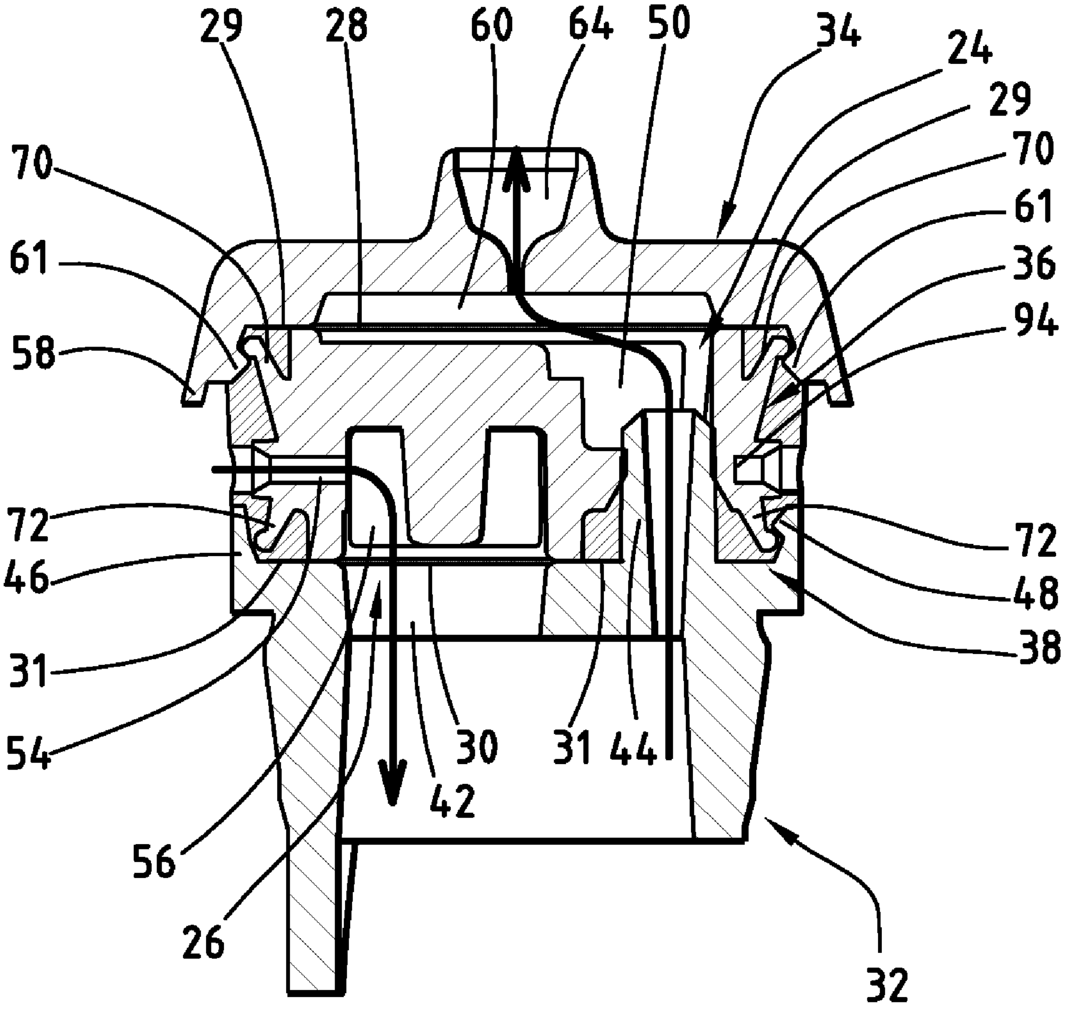

As illustrated in FIG. 5, the connection portion 38 is overmoulded on the lower portion 32, the upper portion 34 and the intermediate portion 36. It serves to provide mechanical connection and sealing between the support portions 32, 34, 36.

The connection portion 38 also serves to immobilise the membranes 28, 30, with the edge regions 29, 31 of the membranes 28, 30 which extend outside the passages 24, 26 being overmoulded.

The connection portion 38 extends between the lower portion 32 and the upper portion 34, engaging on the rims 46, 58, in particular on the internal reliefs 48, 61 of these rims 46, 58.

The connection portion 38 surrounds the intermediate portion 36, forming a sleeve around it. It further provides coverage between the flexible members 70, 72, thus providing effective fixing of the intermediate portion 36 and locks the flexible members 70, 72 so that the intermediate portion can no longer be separated from the lower portion 32 and the upper portion 34.

According to the invention, a method for producing the end-piece 6 comprises an assembly step in which the lower portion 32, the upper portion 34, the intermediate portion 36 and the membranes 28, 30 are stacked and the snap-fitting means (flexible members 70, 72 and reliefs 48, 61) are engaged.

This allows the stacking to be maintained at least temporarily in an adequate manner. This stacking can be readily handled without damaging the membranes 28, 30 since they are held and protected by the lower portion 32, the upper portion 34 and the intermediate portion 36.

Figure 8:
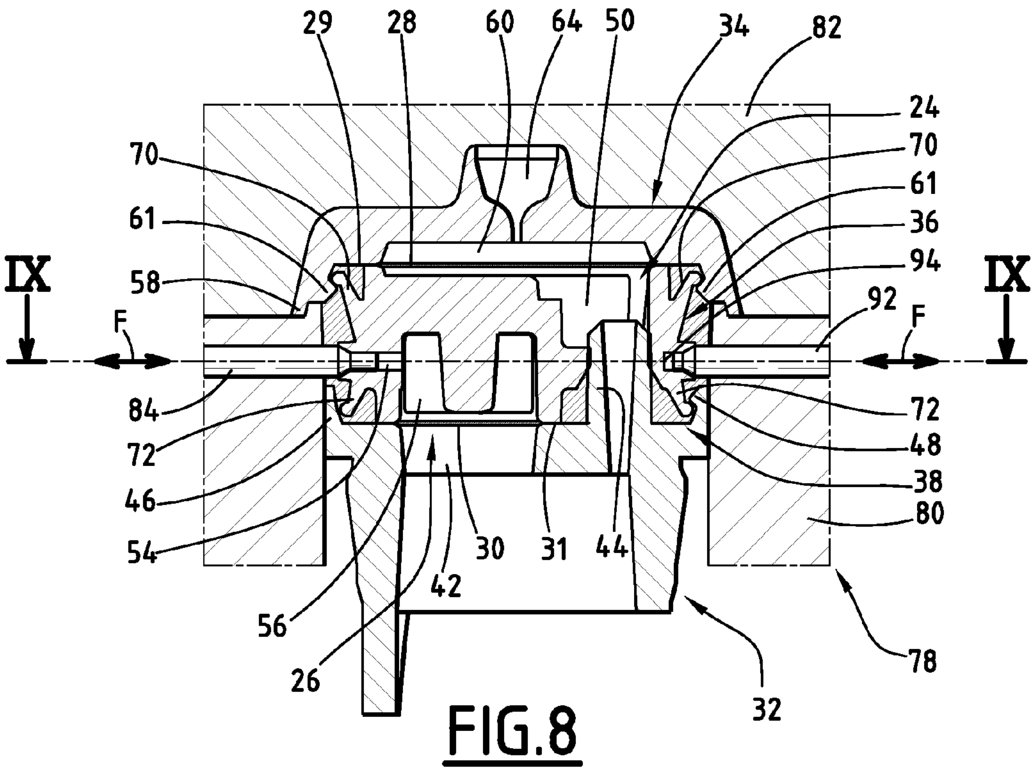
FIG. 8 is a sectioned view of the end-piece received in the mould.

The method then comprises an injection step illustrated in FIG. 8, in which the stack is arranged in a mould 78 which comprises a lower die 80 which comprises a recess for receiving the lower portion 32 and an upper die 82 which comprises a recess for receiving the upper portion 34, then the plastics material is injected under pressure in order to form the connection portion 38.

During the injection step, in order to prevent the molten plastics material from flowing into the inlet channel 54, an insert 84 in the form of a needle is engaged inside the inlet channel 54. The insert 84 is, for example, movably and removably mounted (arrow F) on the lower die 80.

The molten plastics material is injected between the lower portion 32 and the upper portion 34, around the intermediate portion 36. The plastics material flows through the spaces 74 and 76 (FIGS. 6 and 7) between the flexible members 70 and 72 so that it engages on the internal reliefs 41 and 68 and surrounds the flexible members 70 and 72.

Consequently, the connection portion 38 is moulded over the support portions 32, 34, 36 and the edge regions 29, 31 of the membranes 28, 30, which ensures that they are retained relative to the support portions 32, 34, 36.

The connection portion 38 also forms a sealing joint between the support portions 32, 34, 36 which define the passages 24, 26.

In the example illustrated, the connection portion 38 extends in the space between the upper portion 34 and the lower portion 32. The invention is not limited to this embodiment and, in a variant, the connection portion 38 extends outside this space and bypasses the edges of the upper portion 34 and lower portion 32 in order to cover their outer surfaces and further improve the fixing.

The intermediate portion 36 serves to maintain the spacing between the lower portion 32 for connection to the neck 14 and the upper portion 32 for dispensing ophthalmic liquid drop by drop.

During the injection step, the intermediate portion 36 is not supported by the dies 80, 82 of the mould 78.

The pressure applied to the outer surface of the intermediate portion 36 is high and tends to crush the intermediate portion 36. In order to prevent such crushing, and as illustrated in FIGS. 6 and 7, the intermediate portion 36 comprises a set of reinforcement ribs 86 which are arranged in a star-like manner on the upper face of the intermediate portion 36, and a set of ribs 88 which are arranged in a star-like manner on the lower face of the intermediate portion 36. The sets of reinforcement ribs allow the quantity of material used to produce the intermediate portion to be limited, whilst providing it with an adequate level of strength.

Figure 9:
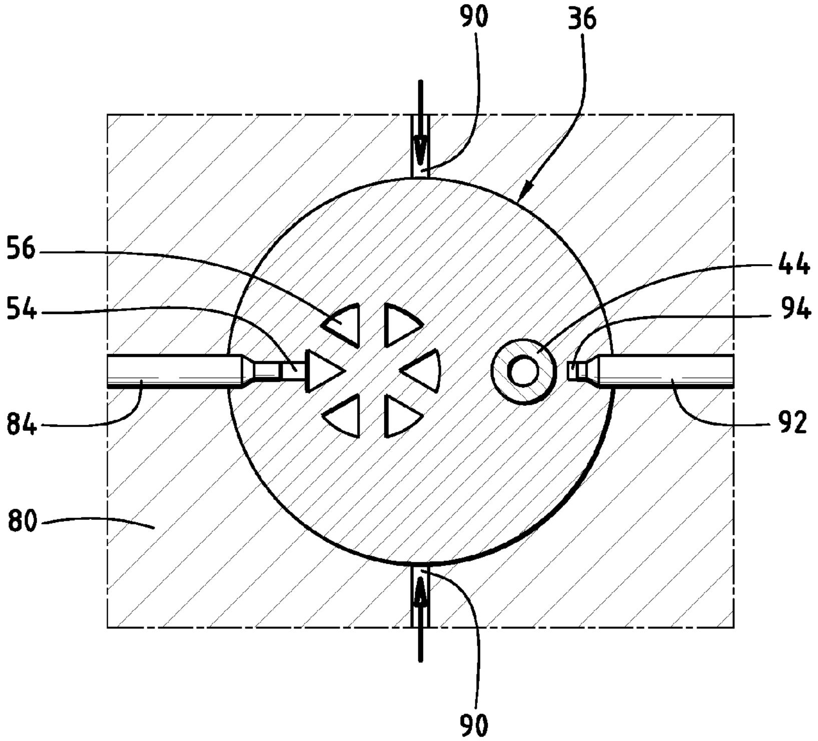
FIG. 9 is a sectioned view along IX-IX of FIG. 8.

Preferably, in order to prevent lateral displacement of the intermediate portion 36 during the injection step, and as illustrated in FIG. 9, the plastics material is injected radially into the closed mould 78 from injection locations which are distributed circumferentially about the axis A-A of the end-piece 6, preferably in a regular manner. For example, two diametrically opposed injection locations 90 are used (FIG. 8).

Furthermore, optionally, the intermediate portion 36 is retained radially inside the mould 78 during the injection step. To this end, as illustrated in FIGS. 8 and 9, it is possible to use the insert 84 for closing the inlet channel 54 and another similar insert 92 which is, for example, diametrically opposed and which is engaged in a blind hole 94 (FIG. 4) provided for this purpose in the intermediate portion 36.

The invention is also used for assemblies for packaging and dispensing other medical liquids which are intended to be dispensed, in particular drop by drop, such as solutions for the nose or the ears.

What is claimed is:

1. A liquid dispensing end-piece, comprising two filtering membranes and support portions for supporting the membranes and channeling liquid and air through respective membranes, wherein the end-piece comprises a connection portion which is moulded over the support portions in order to fix them together, and wherein the support portions comprise an upper support portion, a lower support portion and an intermediate support portion which is arranged between the upper support portion and the lower support portion, wherein one of said membranes is retained between the upper support portion and the intermediate support portion, and the other membrane is retained between the intermediate support portion and the lower support portion; and wherein the end-piece further comprises two fluid circulation passages which are defined by the support portions, each of the membranes extending across a respective passage, one of the passages for circulation of air with the membrane extending across the air passage being hydrophobic, and the other passage for circulation of liquid with the membrane extending across the liquid passage being hydrophilic.

2. The liquid dispensing end-piece according to claim 1, wherein the membranes are overmoulded by the connection portion.

3. The liquid dispensing end-piece according to claim 2, wherein the support portions and the membranes are superimposed in a longitudinal direction (A-A).

4. The liquid dispensing end-piece according to claim 1, wherein the support portions and the membranes are superimposed in a longitudinal direction (A-A).

5. The liquid dispensing end-piece according to claim 1, wherein a said passage has two ends and opens at one end through the upper support portion and at one end through the lower support portion.

6. The liquid dispensing end-piece according to claim 1, wherein the intermediate support portion is connected to both the lower support portion and the upper support portion by means of snap-fitting.

7. The liquid dispensing end-piece according to claim 1, wherein the connection portion surrounds the intermediate support portion.

8. The liquid dispensing end-piece according to claim 1, wherein the intermediate support portion comprises reinforcement ribs.

9. The liquid dispensing end-piece according to claim 8, wherein the end piece further comprises a fluid channelling pipe, and the reinforcement ribs comprise at least one set of radial ribs which extend across the fluid channelling pipe and the intermediate support portion.

10. The liquid dispensing end-piece according to claim 1, wherein the support portions have a stacking axis (A-A), and the connection portion is overmoulded by means of injection from several locations which are distributed about the stacking axis (A-A) of the support portions.

11. The liquid dispensing end-piece according to claim 1, wherein the intermediate portion defines at least one hole for receiving a member for locking an injection mould of the connection portion, which member is intended to be inserted in the at least one hole in order to immobilise the intermediate portion during the injection of the connection portion.

12. The liquid dispensing end-piece according to claim 11, wherein at least one of the at least one holes for receiving a locking member defined by the intermediate portion delimits a portion of a passage for circulation of fluid through the end-piece, which opens laterally via the hole.

13. A liquid packaging and dispensing assembly comprising a receptacle which has a neck, and an dispensing end-piece according to claim 1, arranged on the neck.

* * * * *